United States Patent [19]
Kini

[11] Patent Number: 5,864,659
[45] Date of Patent: Jan. 26, 1999

[54] COMPUTER SERVER WITH IMPROVED RELIABILITY, AVAILABILITY AND SERVICEABILITY

[75] Inventor: Vittal Kini, Aloha, Oreg.

[73] Assignee: Intel Corporation, Santa Clara, Calif.

[21] Appl. No.: 701,193

[22] Filed: Aug. 21, 1996

Related U.S. Application Data

[63] Continuation of Ser. No. 399,775, Mar. 7, 1995, abandoned.

[51] Int. Cl.⁶ .................................................. G06F 11/28
[52] U.S. Cl. ..................... 395/113.07; 315/113; 371/51; 371/12
[58] Field of Search ........................ 395/183.07, 183.02, 395/183.22, 183.19, 183.01; 371/21.2, 5.1

[56] References Cited

U.S. PATENT DOCUMENTS

| | | | |
|---|---|---|---|
| 3,623,011 | 11/1971 | Baynard, Jr. et al. ............. | 395/183.01 |
| 4,695,946 | 9/1987 | Andreasen et al. ................ | 395/183.07 |
| 4,701,845 | 10/1987 | Andreasen et al. ................ | 395/183.07 |
| 5,088,022 | 2/1992 | Iwata .................................. | 395/183.07 |
| 5,163,052 | 11/1992 | Evans et al. ....................... | 395/183.07 |
| 5,179,695 | 1/1993 | Derr et al. .......................... | 395/183.07 |
| 5,200,958 | 4/1993 | Hamilton et al. .................. | 395/183.21 |
| 5,267,246 | 11/1993 | Huang et al. ....................... | 395/183.21 |

*Primary Examiner*—Robert W. Beausoliel, Jr.
*Assistant Examiner*—Pierre E. Elisca
*Attorney, Agent, or Firm*—Blakely, Sokoloff, Taylor & Zafman LLP

[57] ABSTRACT

An apparatus and method for monitoring and controlling the internal state of a computer system, in particular, a computer server. The computer system includes one or more subsystems. These subsystems provide one or more management signals at a system management slot. The computer system also includes an I/O bus slot coupled to an I/O bus of the computer system. A system management agent is coupled to both the system management slot and the I/O bus slot. The system management agent includes a processor and a memory system coupled to the processor. The system management agent also includes a communications interface coupled to the processor and the memory system.

17 Claims, 8 Drawing Sheets

COMPUTER SERVER WITH IMPROVED RELIABILITY, AVAILABILITY AND SERVICEABILITY

This is a continuation of application Ser. No. 08/399,775, filed Mar. 7, 1995, now abandoned.

BACKGROUND OF THE INVENTION

1. Field of the Invention

The present invention relates to the monitoring and controlling of a computer server. More particularly, the present invention relates to the monitoring and controlling of a computer server via system management features which may include performance monitoring, fault monitoring, security monitoring, configuration monitoring, and accounting monitoring. Although the described embodiment is described in terms of an IBM PC/AT-compatible computer server, the system management apparatus and method described herein are not limited to an IBM PC/AT-compatible computer nor is it limited to a computer server. For example, a stand-alone computer may use the apparatus and method described herein for improved reliability, accessibility, and serviceability.

2. Description of Related Art

As personal computers (PCs), such as the IBM PC/AT-compatible personal computers, have become more popular in recent years, a need for improved ways of accessing and sharing data has arisen. Nowadays, many computer systems are linked via networks—for example, a hardwired local area network (LAN) such as Ethernet, a telephone modem link, or other conventional data communications network.

Due to its ever-decreasing price and ever-increasing capabilities, the PC becomes more and more attractive as a replacement for the older and more expensive mainframe computers. Today, a networked PC server can provide much of the capability that a mainframe once provided. A PC server allows other networked PCs to run applications residing only on the PC server. These networked PCs, or PC clients, can access shared data which reside only on the PC server. Furthermore, these networked PC clients may be remote, that is, they need not be located in physical proximity to the PC server.

However, since multiple remote PC clients may rely on a single computer server, a method of improving the reliability of the computer server is desired. One way of monitoring and controlling the state of the PC server is by coupling a system management agent to the computer server via the I/O bus of the computer server. The system management agent is able to monitor and control the computer server through its access to the I/O bus. However, this method only gives a limited ability for monitoring and controlling the computer server since the system management agent may use only those data/address access and transfer mechanisms that are defined by the I/O bus and no others.

SUMMARY OF THE PRESENT INVENTION

The present invention is an apparatus and method for monitoring and controlling the internal state of a computer system, in particular, a computer server. A computer system is made up of various subsystems. These subsystems provide one or more management information signals at a system management slot. The computer system also includes an I/O bus slot coupled to an I/O bus of the computer system. A system management agent (SMA) is coupled to both the system management slot and the I/O bus slot. The system management agent includes a processor and a memory system coupled to the processor. The system management agent also includes a communications interface coupled to its processor and the memory system.

DETAILED DESCRIPTION OF THE PREFERRED EMBODIMENT

The present invention is an apparatus and method for monitoring and controlling the internal state of a PC server. In the following detailed description, numerous specific details are set forth in order to provide a thorough understanding of the present invention. However, it will be apparent to one of ordinary skill in the art that these specific details need not be used to practice the present invention. In other instances, well known structures, interfaces and processes have not been shown in detail in order not to unnecessarily obscure the present invention.

Figure 1:
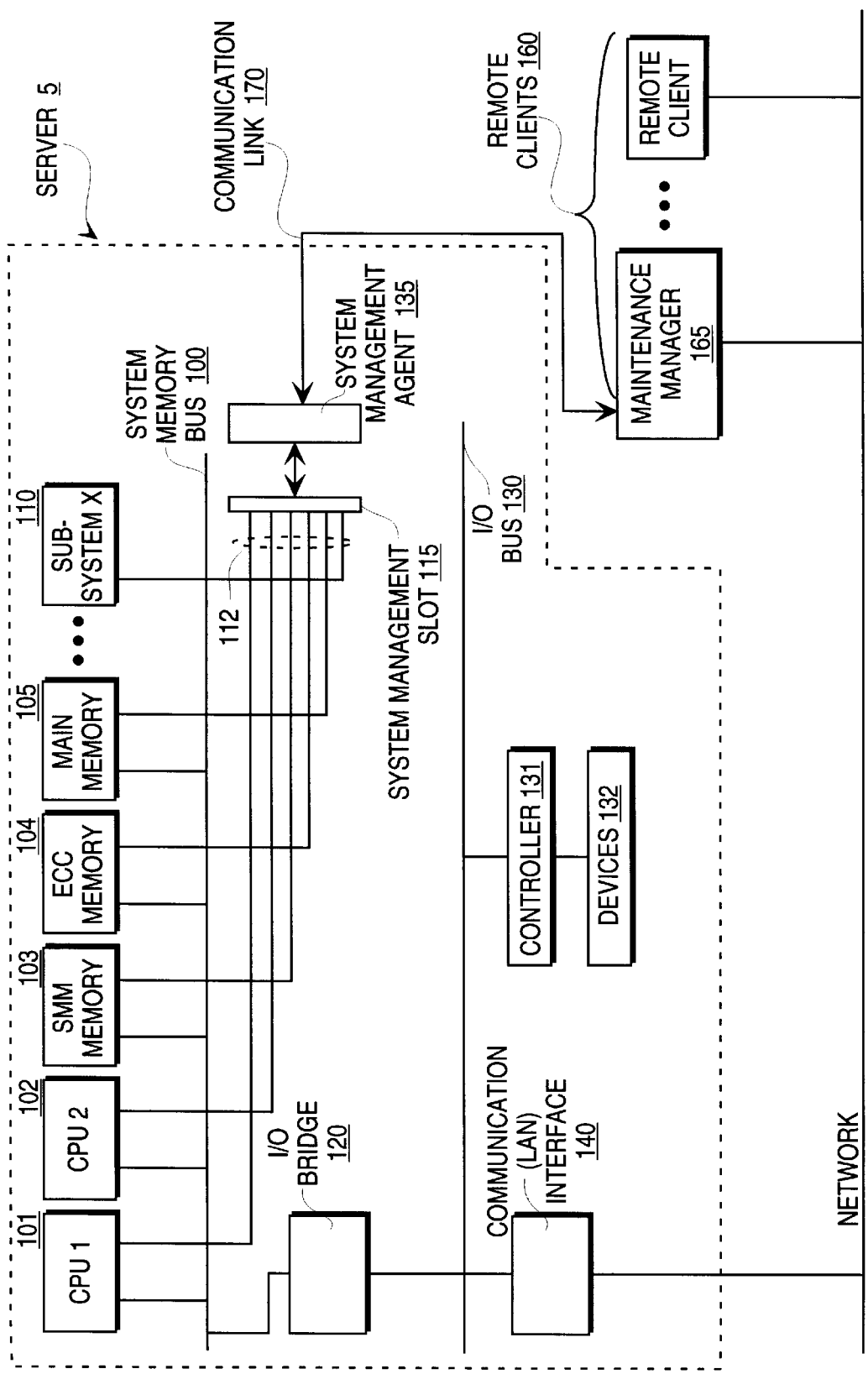
FIG. 1 is a block diagram illustrating the computer system hardware used in the preferred embodiment of the present invention.

FIG. 1 is a block diagram of the computer system hardware used in the preferred embodiment. Although the described embodiment is described in terms of a computer server, the apparatus and method described herein are not limited to a computer server. The computer system used in the preferred embodiment comprises a computer server 5. The computer server 5 comprises a system memory bus 100 for communicating information between computer system components. These components coupled to the system memory bus 100 include a processor, or CPU 101. In the preferred embodiment, CPU 101 is an i486 or Pentium brand microprocessor manufactured by Intel Corporation, Santa Clara, Calif. The i486 and Pentium marks are trademarks of Intel Corporation. One or more additional processors, or CPUs 102, may also be coupled to the system memory bus 100. Other system components include Random Access Memory (RAM) 103-105. In the described embodiment, the RAM can include system management memory (SMM) 103, error correction code (ECC) memory 104, and main memory 105. The computer system of the preferred embodiment also includes various other system components, or subsystems 110, which are coupled to the system memory bus 100.

Each of the subsystems 101–110 which are coupled to the system memory bus 100 optionally provides one or more management signals 112 to a system management slot 115. The management signals 112 include signals which allow for system management features such as those for performance monitoring, fault monitoring, security monitoring, configuration monitoring, and accounting monitoring. Performance monitoring includes measuring the throughput time of various jobs. This may include determining where a performance bottleneck is, and trying to avoid the bottleneck. Fault monitoring includes detecting faults and the notification, handling, and logging of the faults. Security monitoring includes detection of security breaches, such as attempts to access protected data. Configuration monitoring includes detection of the hardware and software installed in the system. This may include installing certain software drivers dependent upon the configuration. Accounting monitoring includes taking statistical data of the computer resource allocation.

Although the management signals 112 can be used for performance, fault, security, configuration, and accounting monitoring, for simplicity, the rest of the description will focus on the fault monitoring aspects of system management. The described principles can be applied to the other type of system management monitoring. For example, the description of a procedure for handling a fault signal may be nearly identical for handling a security monitoring signal indicating a breach in data protection. Referring again to FIG. 1, each subsystem optionally provides one or more management signals. These signals can be in the form of a single error signal, a diagnostic bus, or a set of boundary scan signals, such as those described in the IEEE JTAG standard 1149.1-1990published by the Institute of Electrical and Electronics Engineers (IEEE). The management signals can also be any combination of single signals, diagnostic buses, or boundary scan signals.

The system memory bus 100 is also coupled to an I/O bridge 120 which provides an interface to an I/O bus 130. The I/O bus 130 typically comprises all data and address signals, some control signals, and power and ground signals. Various controllers, such as controller 131, are coupled to the I/O bus 130 for controlling various devices such as device 132. For example, controller 131 can be a mouse controller, and device 132 can be a mouse, or controller 131 can be a hard disk controller, and device 132 can be a hard disk.

A system management agent (SMA) 135 is coupled to both the system management slot 115 and the I/O bus 130. The SMA 135 will be described in more detail later with respect to FIG. 2.

A communication interface 140, such as a LAN interface, is coupled from the I/O bus to a network 150. Various remote client computers 160 are coupled to the network 150. One of the remote clients can serve as a maintenance manager 165 for the computer server 5. The SMA 135 and the maintenance manager 165 are coupled by a communication link 170, as will be described later. The SMA 135 and the maintenance manager 165 jointly control and monitor the state of the computer server 5.

Figure 2:
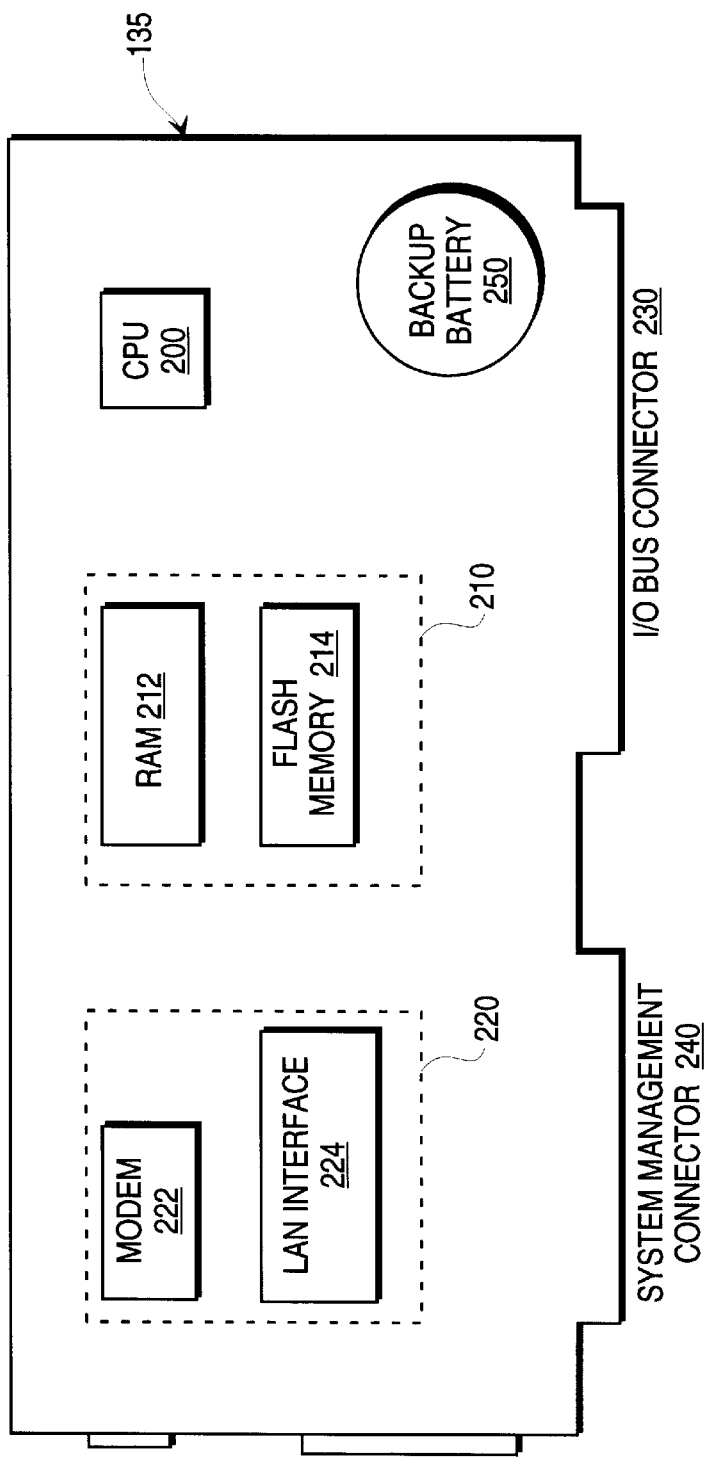
FIG. 2 is a block diagram showing the general form and the components of the system management agent (SMA).

FIG. 2 shows a block diagram showing the general form and the components of the SMA 135. The SMA comprises a processor, or CPU 200, a memory system 210, and a communication interface 220.

The memory system 210 comprises a random access memory (RAM) 212. The memory system 210 also includes non-volatile memory, such as a Flash memory 214, which stores instructions making up programs which the CPU 200 can execute.

The communication interface 220 includes a MODEM 222 and/or a LAN interface 224.

In the preferred embodiment, the server 5 is an IBM PC/AT compatible computer, and the SMA 135 is an add-in card which can plug into the I/O bus slot of the computer server 5, as will be described with respect to FIG. 3. The SMA 135 includes an I/O bus connector 230, which allows coupling to an I/O bus such as, for example, an EISA/ISA bus or a PCI bus. The SMA 135 also includes a system management connector 240.

The SMA 135 includes a backup battery 250 which is coupled to the SMA CPU 200, the RAM 212, the Flash memory 214, the MODEM 222 and the LAN interface 224.

Figure 3:
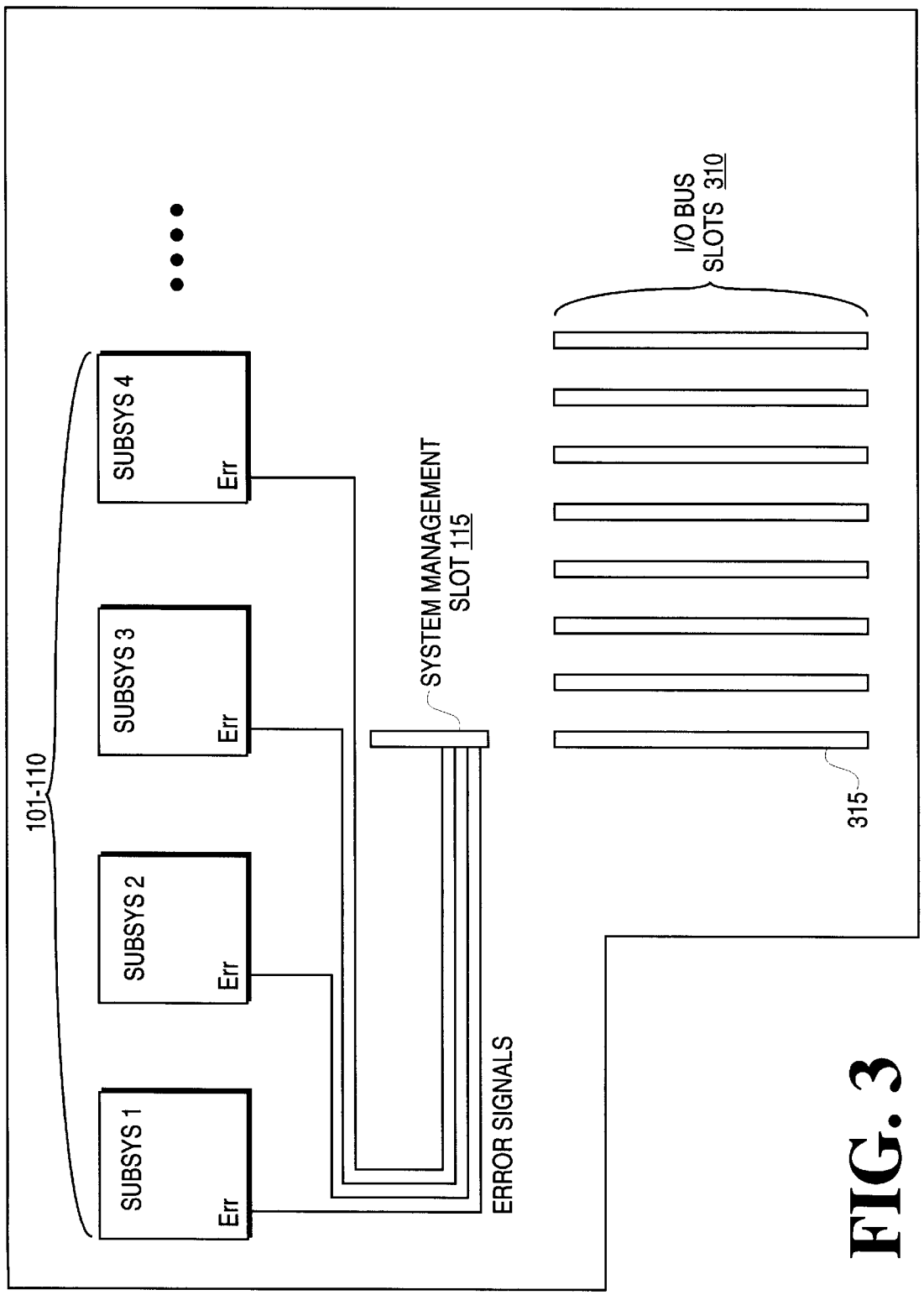
FIG. 3 shows another view of the preferred embodiment of the computer server showing the accessibility to the I/O bus and to the system management signals via the I/O bus slots and the system management connector.

FIG. 3 shows another view of the preferred embodiment of the computer server 5 showing the plug-in accessibility of an add-in card to the I/O bus 130 (FIG. 1) via I/O bus slots 310. In this configuration the system management slot 115 is shown in-line with one of the slots (slot 315) of the I/O bus slots 310. This allows for the SMA 135 add-in card of FIG. 2 to be inserted into both the system management slot 115 and the in-line I/O bus slot 3 15 at the same time. This allows for the SMA 135 to couple to the various signals on the I/O bus, such as power, ground, data, address, and control signals, which reduces the need for duplicate routing of these signals from the subsystems 101–110 to the SMA 135 via the system management slot 115. Typically, the system management signals 112 do not include power or ground signals. In another embodiment, the system management slot may be located elsewhere in the system and the SMA 135 would be connected to the system management slot 115, for example, via a ribbon cable. However the SMA would continue to derive its power as well as other standard signals such as address and data from the I/O bus slot into which it is plugged.

One advantage of providing the system management capabilities on an add-in board, instead of included as part of the motherboard circuitry, is that a purchaser of a computer server need not be required to buy such capabilities unless he needs the extra reliability, accessibility, serviceability, or other monitoring capability. This permits manufacturers to keep down the cost of the servers in a very price-sensitive market.

Figure 4:
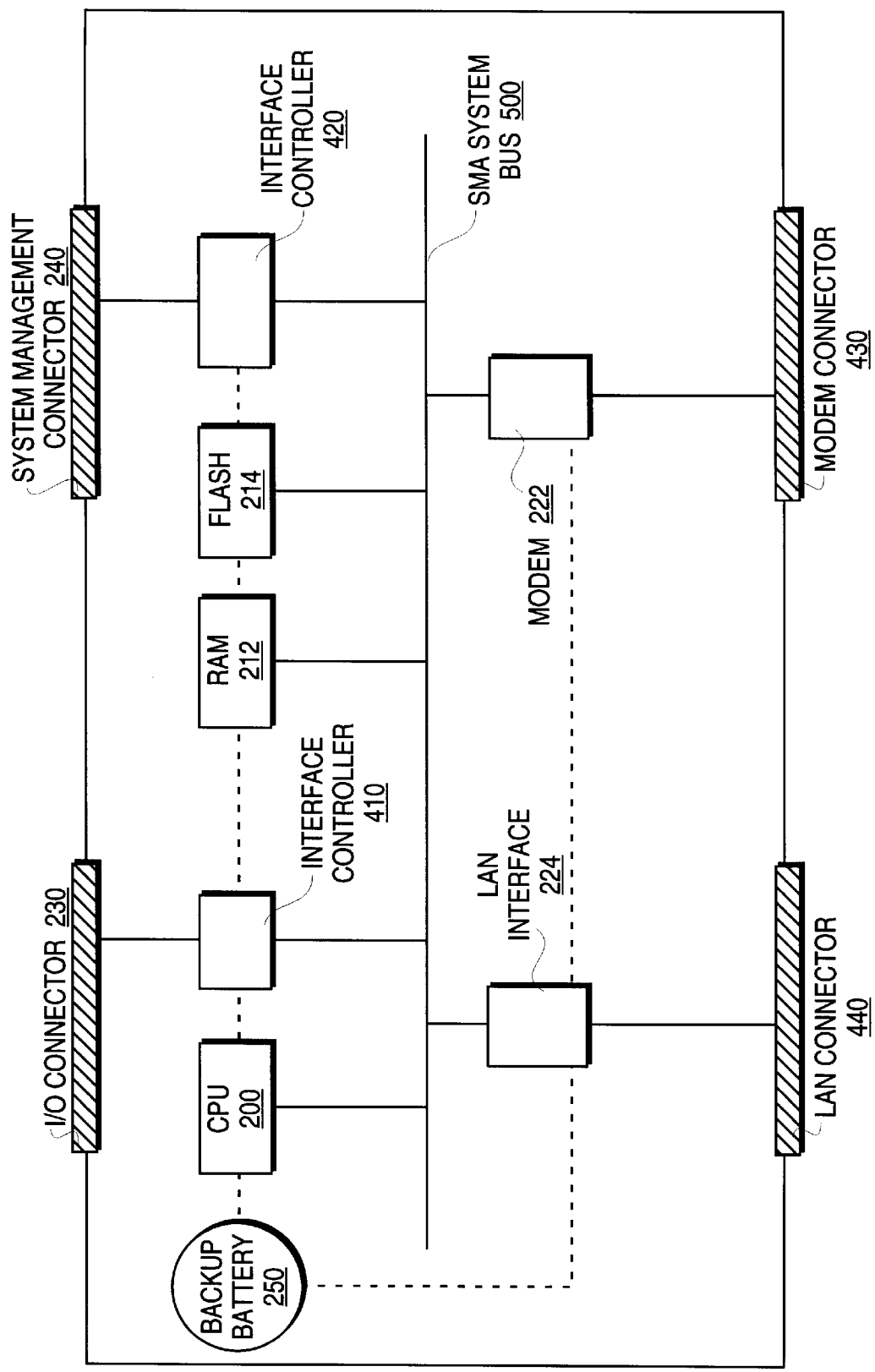
FIG. 4 shows the internal structure of the SMA.

FIG. 4 shows one embodiment of the internal structure of the SMA 135. The CPU 200 is coupled via a SMA system bus 500 to the RAM 212, the Flash memory 214, the MODEM interface 222, and the LAN interface 224. An interface controller 410 couples the SMA system bus 500 to the I/O connector 230, and an interface controller 420 couples the SMA system bus 500 to the system management connector 240. Additionally, the MODEM interface 222 is coupled to a MODEM connector 430, and the LAN interface 224 is coupled to a LAN connector 440. The MODEM connector 430 and the LAN connector 440 can be PCMCIA connectors, for example.

The backup battery 250 is coupled to each of the components on the SMA 135: the CPU 200, the interface controller 410, the RAM 212, the Flash memory 214, the interface controller 420, the LAN controller 224, and the MODEM 222. The backup battery technology is well-known. The backup battery 250 may be any one of various types, and may physically reside either on the SMA 135 itself, or may be physically detached from but electrically coupled to the SMA 135 itself In case of a power failure on the computer server 5, the backup battery 250 provides power to the SMA 135 to allow the SMA to continue to operate for a limited period of time.

In the described embodiment, at least one of the communication interfaces 220, i.e., either the MODEM 222 or the LAN interface 224, couples the SMA 135 to the maintenance manager 165 via the communication link 170 (FIG. 1). In the preferred embodiment, the MODEM 222 is a dial-out MODEM, which allows the SMA 135 to initiate communication with the maintenance manager 165. The SMA uses this communication link particularly when the computer server that it is monitoring is not functioning or has lost system power.

Figure 5:
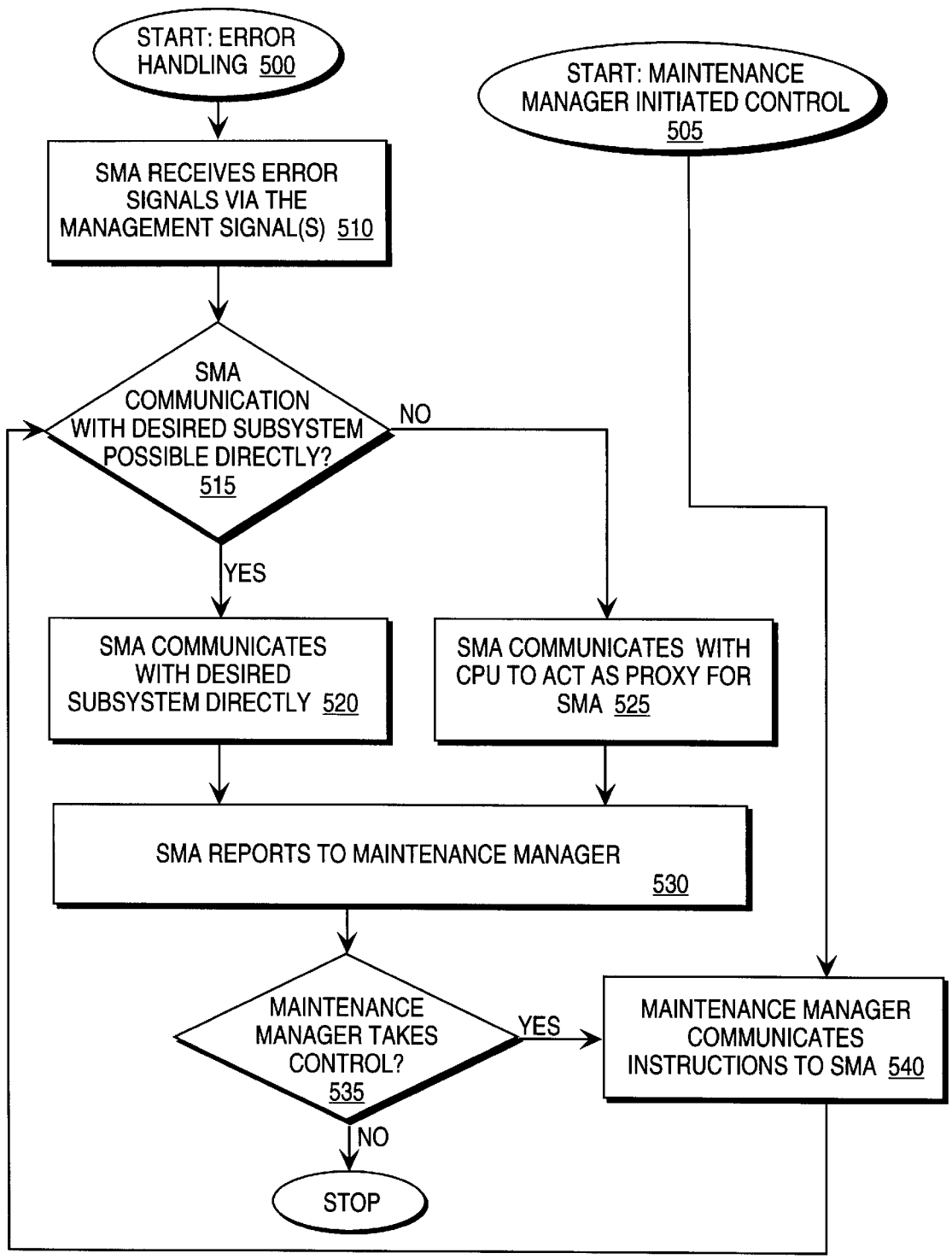
FIG. 5 is a flowchart of the maintenance manager monitoring the state of the computer server.

FIG. 5 shows a flowchart of the processing performed by the SMA 135 and the maintenance manager 165 in monitoring and controlling the state of the computer server 5. Fault handling begins at a flowchart block 500 in response to a fault signal received by the SMA 135 from one of the subsystems 101–110. As was previously discussed, a similar procedure could occur for system management signals indicating actions in the area of performance, security, configuration or accounting monitoring. In contrast, maintenance manager-initiated control begins at a flowchart block 505. Maintenance manager-initiated control applies to all areas of system management in which the maintenance manager 165 asserts control over the SMA 135.

From the flowchart block 500, operation moves to an operation block 510, at which the SMA 135 receives management signals 112 from one or more of the subsystems 101–110 coupled to the system management slot 115.

From the operation block 510, operation moves to a decision block 515, at which the SMA 135 determines whether it is able to communicate with the desired subsystem or subsystems 101–110 directly. If the SMA 135 is able to communicate with the desired subsystem(s) 101–110 directly, then operation moves to an operation block 520. At the operation block 520, the SMA 135 communicates directly with the subsystem(s) 101–110 by running programs stored in the SMA memory system 210. The SMA 135 can communicate to the desired subsystems via the management signals 112, or it can communicate to the subsystem(s) 101–110 via the I/O bus 130 and the I/O bridge 120. However, it is normally preferable to communicate directly with the desired subsystem via the management signals 112, since the management signals 112 can be designed to provide more informative information to the SMA 135 than the standard signals on the I/O bus 130.

Figure 6:
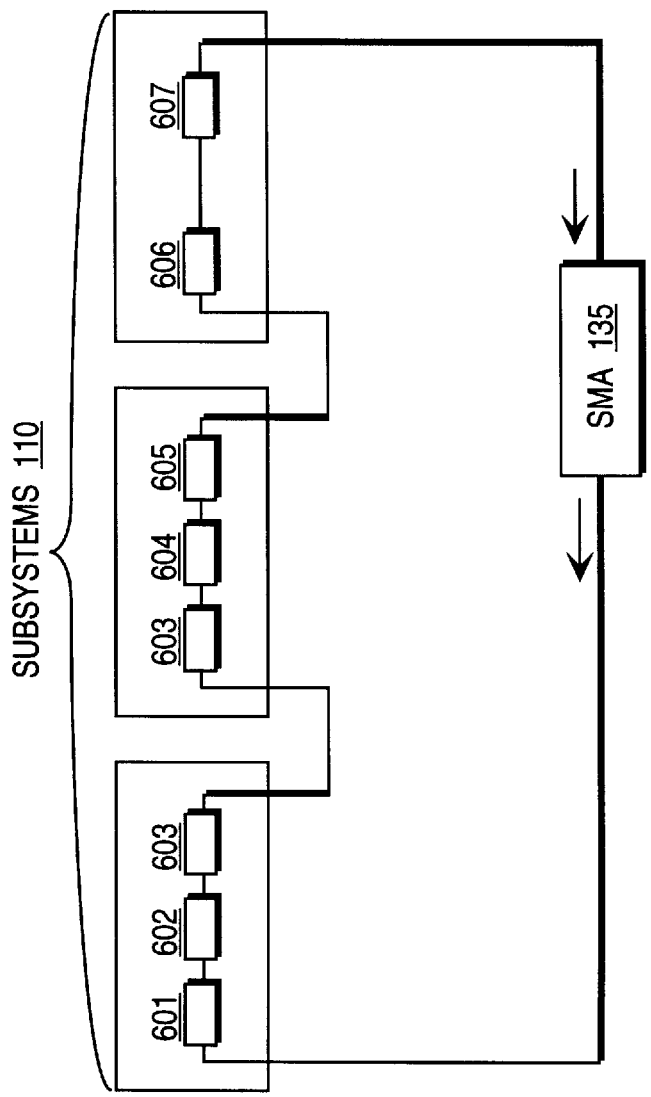
FIG. 6 is a block diagram of the SMA communicating to various subsystems via the management signals in one embodiment of boundary scan.

FIG. 6, for example, shows a block diagram of the SMA 135 communicating to various subsystems 110 via the management signals 112 in one embodiment of boundary scan. The components 600–607 of the various subsystems 110 are connected in series, and the SMA 135 clocks out the boundary scan signals via the SMA's system management connector 240 as provided for in the IEEE JTAG standard 1149.1-1990. The system management connector 240 (FIG. 2) in turn is coupled to the subsystems 110 via the system management slot 115 and the management signals 112.

In another embodiment, if the ECC memory 104 detects an error, it communicates an error syndrome and an error address via the management signals 112 directly to the SMA 135. With the error syndrome and the error address the SMA 135 is then able to determine corrective procedures and implement them.

Figure 7:
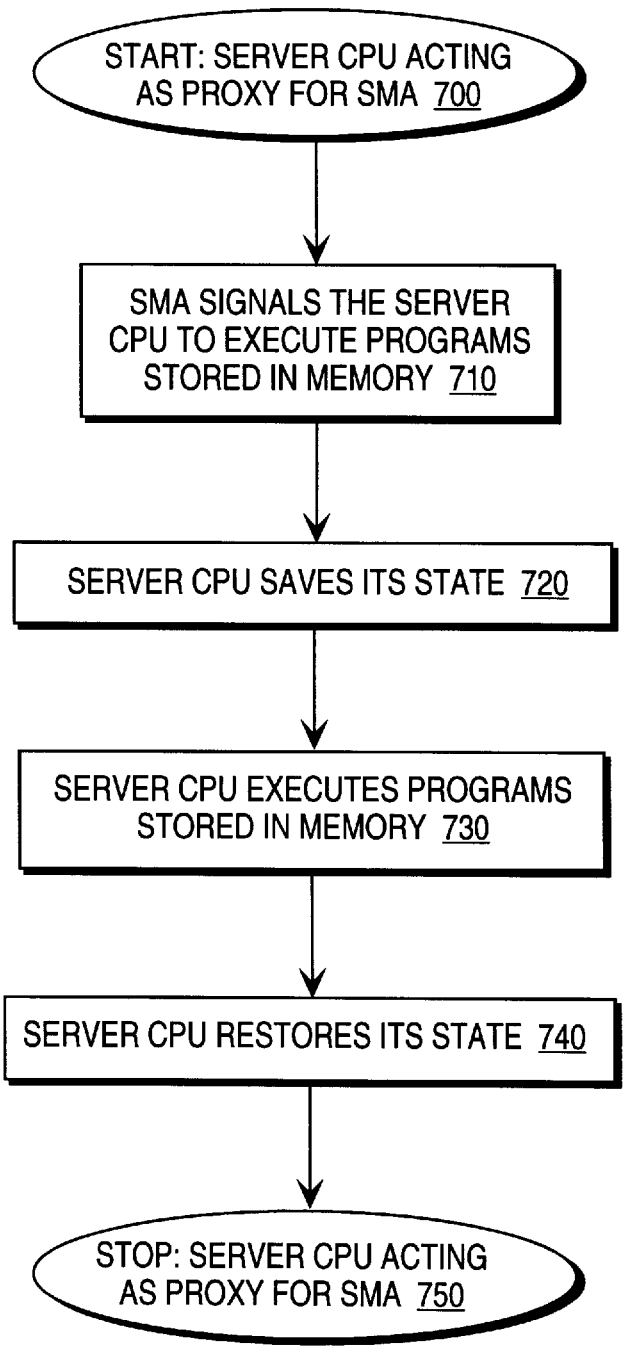
FIG. 7 is a flowchart showing the steps taken by the computer server's CPU in acting as a proxy for the SMA.

Returning to FIG. 5, if the SMA 135 is not able to communicate with the desired subsystem(s) 102–110 directly, i.e., via the management signals 112, then operation moves to an operation block 525, at which the SMA 135 communicates via the I/O bus 130 and the I/O bridge 120 to the server CPU 101 to act as its proxy, as is shown in FIG. 7, and which will be described later.

From the operation blocks 520 and 525, operation moves to an operation block 530, at which the SMA 135 reports information obtained from the subsystem(s) 101–110 to the maintenance manager 165. The SMA 135 communicates with the maintenance manager 165 via the communication link 170 by means of either the MODEM 222 or the LAN interface 224. The maintenance manager 165 may then log the errors. From the operation block 530, operation moves to a decision block 535.

At the decision block 535, the maintenance manager decides whether it wants to take over control of the SMA 135. If the maintenance manager 165 decides to take control of the SMA 135, then operation moves to an operation block 540, at which the maintenance manager 165 communicates instructions to the SMA 135 via the communication link 170. This communication of instructions may be in the form of signaling the SMA 135 which programs to execute from a selection of stored programs within the SMA's memory system 210, or the maintenance manager 165 may download a new set of instructions via the communication link 170 into the SMA's memory system 210, after which the SMA 135 is signaled to execute the instructions that were downloaded. From the operation block 540, operation moves to the operation block 515.

However, if at the decision block 535, the maintenance manager 165 decides not to take over control of the SMA 135, then operation moves to a flowchart block 550, at which operation terminates.

Alternatively, from the flowchart block 505, under maintenance manager-initiated control, operation moves to the operation block 540, from which operation continues as described above.

FIG. 7 is a flowchart showing the steps taken by the computer server's CPU 101 in acting as a proxy for the SMA 135. Operation begins at a flowchart block 700. From the flowchart block 700, operation moves to an operation block 710. At the operation block 710, the SMA 135 signals the CPU 101 ofthe computer server 5 to execute a program stored in one of the memory subsystems 103–105. For example, the SMA 135 may signal an interrupt to the CPU 101 and provide information about the cause of the interrupt via either the I/O bus 130 or the management signals 112.

Operation then moves to an operation block 720, at which the CPU saves its state so that it may return to its previous state after the interrupt. From the operation block 720, operation moves to an operation block 730. At the operation block 730, the CPU 101 executes from the programs stored in its memory subsystem 103-105. For example, the CPU 101 may perform a diagnostic on one of the subsystems 110.

From the operation block 730, operation moves to an operation block 740, at which the CPU 101 restores its state to that prior to the interrupt. Operation then moves to a flowchart block 750, at which operation terminates.

In one embodiment, the SMA 135 interrupts the CPU via an SMI interrupt which causes the CPU 101 to enter System Management Mode (SMM), as described by the INTEL 486SL™ databook. In SMM, the CPU 101 executes out of a private memory area, the SMM memory area 103. The CPU 101 only executes out of the SMM memory area while in SMM. Executing out of SMM automatically causes the CPU to save its state, and exiting SMM causes the CPU to restore its state. Thus, the steps of saving and restoring described in operation blocks 720 and 740 are not required if the SMI interrupt is used. Additionally, executing out of SMM also provides the advantage of being able to execute the programs in the SMM memory 103 independent of any operating system conflicts since the operating system is disabled while the CPU 101 executes out of SMM.

Figure 8:
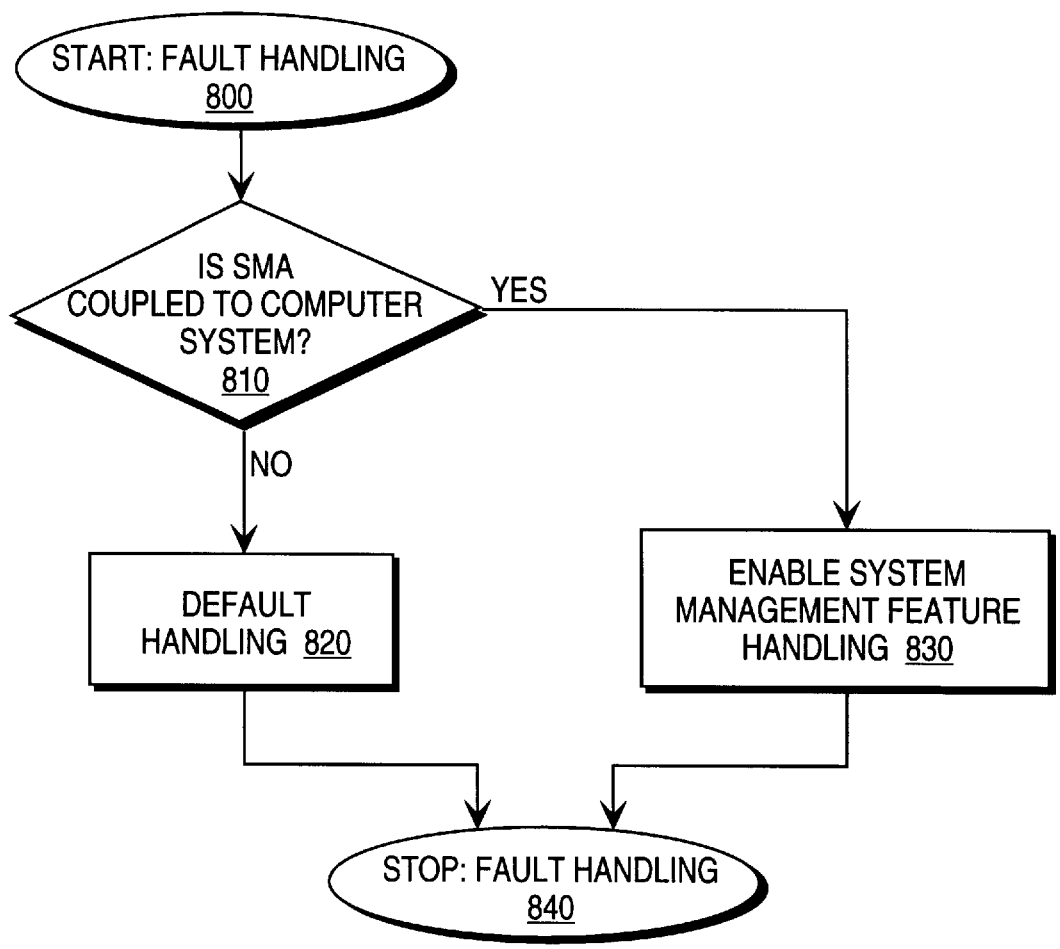
FIG. 8 is a flowchart showing the computer system handling of a fault varies dependent upon whether a SMA is coupled to the computer system.

FIG. 8 is a flowchart showing the computer system 5 handling of a fault varies dependent upon whether a SMA 135 is coupled to the computer system 5. As was previously discussed, although this example is in terms of fault handling, the same principles apply to other type of system management handling. Operation begins at a flowchart block 800. From the operation block 800, operation moves to a decision block 810. At the decision block 810, the computer system determines whether a SMA 135 is coupled to the computer system 5.

If the SMA 135 is not coupled to the computer system, then operation moves to an operation block 820. At the operation block 820, a default operation of handling the fault occurs.

However, if at the decision block 810, a SMA 135 is coupled to the computer system 5, then operation moves to an operation block 830. At the operation block 830, certain system management features are activated in response to the coupling of the SMA 135 to the computer system 5. These activated system management features may override the default handling of the computer system, as shown in the operation block 820. For example, handling a fault without a SMA 135 installed in the computer system 5 may be accomplished by the computer system processor 101 running a program in memory 105. However, after the SMA 135 is installed, the same fault handling may be performed by the SMA processor 200 running a program from the SMA memory system 210, or by the SMA 135 controlling the computer system processor 101 to perform certain operations. From the operation blocks 820 and 830, operation moves to a flowchart block 840, at which operation terminates.

Thus, an apparatus and method for monitoring and controlling the internal state of a computer server is disclosed. The specific arrangements and methods described herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. A computer system comprising:
   a system memory bus;
   an input/output bus slot coupled to an input/output bus;
   a system management slot coupled to the system memory bus;
   one or more subsystems, each subsystem providing one or more management signals to the system management slot, the management signals including at lease one signal which is not included on the input/output bus;
   a system management agent detachably coupled to the system management slot and detachably coupled to the input/output bus slot;
   the system management agent including,
      a processor,
      a memory system coupled to the processor,
      instructions stored in the memory system performing autonomous logic and control functions, and
      a communication interface coupled to the processor and the memory system;
      wherein the communication interface provides a connection to a maintenance manager, wherein the maintenance manager controls the system management agent.

2. The computer system of claim 1 wherein the system management agent is an add-in card.

3. The computer system of claim 1 wherein the communication interface is a LAN interface.

4. The computer system of claim 1 wherein the communication interface is a MODEM interface.

5. The computer system of claim 4 wherein the communication interface allows connection to a maintenance manager, wherein the computer system is a computer server and the maintenance manager is a remote client of the computer server, and the computer server and the maintenance manager are connected via a network.

6. The computer system of claim 1 wherein the maintenance manager is a second computer system.

7. A method for monitoring and controlling the internal state of a computer server having an input/output bus and one or more subsystems, the input/output bus containing input/output signals, the input/output signals coupled to an input/output connector, the one or more subsystems providing one or more management signals to a system management connector, the management signals including at least one signal which is not one of the input/output signals, both the input/output connector and the system management connector coupled to a system management agent, the system management agent comprising a processor, a memory system, and a communication interface, the method comprising the steps of:
   (a) providing both the input/output bus signals and the one or more system management signals to the systems management agent; and
   (b) executing instructions stored in the memory system of the system management agent for monitoring and controlling the state of the computer system, the executing of instructions performed by the processor of the system management agent;
   wherein the system management agent is an add-in board and the step (a) is perfected by inserting the system management agent add-in board into the computer server in order to couple the input/output signals and the system management signals simultaneously to the system management agent.

8. The method of claim 7 wherein the step (a) of inserting the system management agent add-in board into the computer server activates system management features.

9. The method of claim 8 further including the step of:
   (c) communicating information about the state of the computer system to a maintenance manager via the communication interface, the maintenance manager being a second computer system.

10. The method of claim 9 further including the step of:
    (d) logging the error information.

11. The method of claim 10 further including the step of:
    (e) the maintenance manager communicating with the system management agent to control the system management agent.

12. The method of claim 11 further including the step of:
    (f) the maintenance manager downloading instructions to the system management agent.

13. A system management agent comprising:
    a processor;
    a memory system coupled to the processor;
    instructions stored in the memory system performing autonomous logic and control functions;
    a communication interface coupled to the processor and the memory system;

a first interface means for detachably coupling input/output signals from an input/output bus of a computer server to the system management agent; and a second interface means for detachably coupling system management signals from a computer server to the system management agent, the system management signals including at least one signal which is not included in the input/output signals;

wherein the first interface means and the second interface means are positioned for coupling both the first interface means and the second interface means to a computer system simultaneously.

14. The computer system of claim 13 wherein the system management agent is an add-in card.

15. The system management agent of claim 14 wherein the second interface means does not couple any power or ground signals to the computer system.

16. The system management agent of claim 14 wherein the second interface means employs a ribbon cable to couple the system management agent to the computer system.

17. The system management agent of claim 13 further comprising a backup battery.

* * * * *